M. GARLAND.
EXPANDING CABLE WHEEL.
APPLICATION FILED NOV. 21, 1908.
924,338.                                    Patented June 8, 1909.
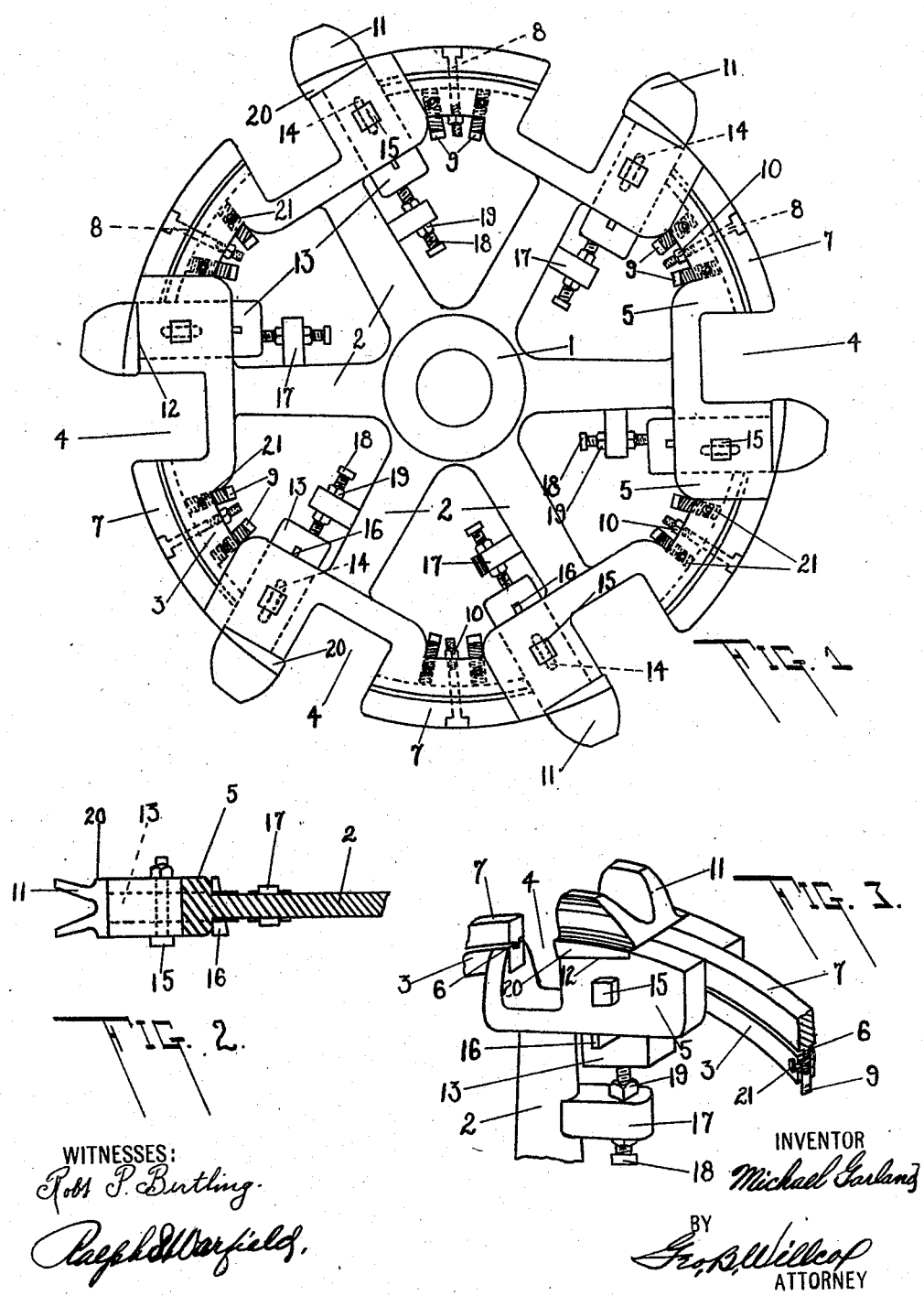

UNITED STATES PATENT OFFICE.

MICHAEL GARLAND, OF BAY CITY, MICHIGAN, ASSIGNOR TO M. GARLAND COMPANY, OF BAY CITY, MICHIGAN, A CORPORATION OF MICHIGAN.

EXPANDING CABLE-WHEEL.

No. 924,338.  Specification of Letters Patent.  Patented June 8, 1909.

Application filed November 21, 1908. Serial No. 463,881.

*To all whom it may concern:*

Be it known that I, MICHAEL GARLAND, a citizen of the United States, residing at Bay City, in the county of Bay and State of Michigan, have invented certain new and useful Improvements in Expanding Cable-Wheels; and I do hereby declare the following to be a full, clear, and exact description of the invention, such as will enable others skilled in the art to which it appertains to make and use the same.

My invention relates to expanding cable wheels for cable conveyers.

In cable conveyers wherein the flights are secured to the cable, it becomes necessary to provide a gapped cable wheel to support and drive the cable, the flights receivable in the gaps in the periphery of the wheel.

One object is to provide a wheel by the use of which the uniformity of pitch between the chain or cable and the wheel may be preserved. Thus the wheel can be readily adjusted to a new or an old chain or cable to take up the wear in an old cable or to afford compensation for wear in the new cable. The tendency of a wheel is to wear toward the center, i. e. to reduce its diameter thereby shortening the pitch of the teeth.

One advantage of my invention is the ease and facility with which the wheel can be expanded to take up wear in itself or stretching or wear in the cable conveyer.

Another advantage is the provision of a strong, compact and durable wheel of this character consisting of but few parts not liable to get out of order.

Another advantage is the provision of a wheel which will be as firm and rigid as though it were solid throughout.

To these and other ends, therefore, my invention consists in certain novel features and combinations, such as will be more fully described hereinafter and particularly pointed out in the claims.

In the accompanying drawing, Figure 1 is a side view of a wheel constructed in accordance with my invention, Fig. 2 is a detail sectional view showing one of the teeth, and Fig. 3 is a detail perspective view showing a fragment of the wheel including one tooth and the gap adjacent thereto.

The wheel consists of a hub (1) from which radiate the spokes (2), (2) the outer ends of which are secured to a periphery (3) having gaps (4), (4) therein to accommodate the flights of a cable conveyer (not shown). The periphery at points adjacent the gaps (4) is enlarged and thickened as at (5,) (5) to form bases for the extensible teeth, and the outer face of the periphery is grooved to receive the ribs (6,) (6) carried by the sectional rim. This rim is composed of several extensible arc-shaped sections (7,) (7) seated on the periphery. The thickened portions (5,) (5) of the periphery are recessed to receive the ends of such sections. These sections are held in place against radial movement by the tension bolts 8, 8 countersunk in the outer faces of the sections and extending therethrough and through the periphery (3). Set screws (9,) (9) carried by the periphery project radially therethrough, the inner ends of the set screws engaging the ribs of the sections. The set screws are held in place by means of holding screws (21,) (21) carried by the periphery and extending laterally thereinto, whereby the inner ends of the holding screws engage the set screws (9,) (9). The sections are prevented from endwise movement by the bolts 8 and from lateral movement by the ribs (6) in the grooves and by the recesses in the thickened portions (5,) (5) which receive the ends of the rim sections.

In order to adjust the positions of the sections, the nuts (10) on the tension bolts (8) are loosened, the holding screws (21) slacked off, and the set screws operated to force the rim sections radially outward the desired distance, whereupon the nuts (10) are tightened on the bolts to firmly secure the sections in place and the holding screws tightened to retain the set screws in place.

The sections can be expanded or contracted radially, as desired.

The thickened portions (5,) (5) adjacent the gaps (4) are each radially apertured to form sockets for the teeth. These teeth may be of any desired shape, but I preferably use a tooth, the head of which is grooved, as shown. The heads (11) are received in seats (12) formed on the outer faces of the thickened portions (5), the stems (13) of the teeth being received in and extending through the radial apertures so that the lower ends of such stems project below the periphery (3) adjacent the spokes (2).

The stems are each provided with a radial slot (14), and a bolt (15) passes laterally through the thickened portions (5) and the slots (14) to limit the amount of outward movement afforded the teeth.

In order to retain the teeth firmly in position, the inwardly projecting end of each stem is provided with a laterally extending opening adapted to receive a wedge-shaped key (16) which bears against the inner face of the thickened portion and the inner end of the opening respectively.

Lugs (17) (17) project from the spokes (2), (2) immediately below the lower end of each stem (13), such lugs carrying set screws (18) held in place by the lock nuts (19). The outer ends of the set screws engage the inner ends of the stems.

When it is desired to adjust the positions of the teeth, the keys (16) are removed, the lock nuts (19) loosened and the set screws operated, after which the lock nuts are tightened and the keys reinserted in their openings and driven in.

The shoulders (20,) (20) on the head may be curved in the same arc as are the rim sections (7), (7).

From the foregoing it is evident that I have devised a simple and easily operated expanding wheel capable of fine adjustment and one which will take up wear, and hence materially extend the life of the conveyer.

Having thus fully disclosed my invention, what I claim as new, is:

1. An expanding wheel comprising a rigid periphery, teeth carried by and adjustable relative to the periphery, and a sectional rim, the sections of which are adjustably connected to the periphery between each two teeth.

2. An expansible conveyer wheel comprising a periphery provided with gaps, teeth mounted in and adjustable radially of the periphery, and a sectional rim, the sections of which are secured and radially adjustable relative to the periphery.

3. An expansible conveyer wheel comprising an inexpansible gapped periphery grooved intermediate the gaps, a sectional rim T-shaped in cross-section to form ribs receivable in and conforming to the grooves in the periphery, and means for retaining the sectional rim in position.

4. An expansible conveyer wheel comprising an inexpansible gapped periphery having radially apertured thickened portions formed thereon, teeth consisting of heads and stems, the stems receivable in the apertures, the thickened portions having seats formed therein to receive the heads and means for adjusting the teeth radially.

5. An expansible conveyer wheel comprising a periphery having radially apertured thickened portions formed thereon, teeth adjustably received in the apertures, a sectional rim adjustably mounted on the periphery, the thickened portions each being recessed to receive the adjacent ends of the sections.

6. An expansible conveyer wheel comprising a periphery having radially apertured thickened portions, teeth consisting of heads and stems, the stems adjustably received in the apertures, a sectional rim adjustably secured to the periphery, and shoulders on the heads curved in the arc of curvature of the sectional rim.

7. An expansible conveyer wheel comprising a gapped periphery having radially apertured thickened portions spaced apart from each other, teeth consisting of heads and stems, the stems receivable in and projecting through the apertures, suitably supported lugs, set screws carried by the lugs, the outer ends of the set screws engaging the inner ends of the stems, means for loosely connecting the teeth and thickened portions and means for locking the teeth in adjusted position.

8. An expansible wheel comprising a periphery having radially extending apertures, teeth consisting of heads and stems, the stems received in and projecting through the apertures, means for adjusting the teeth radially, means loosely connecting the teeth and periphery to permit adjustment, the stems being slotted, and keys received in the slots and engaging the periphery to retain the teeth firmly in adjusted position.

9. An expansible wheel comprising an apertured periphery, teeth consisting of heads and slotted stems, the stems received in and projecting through the apertures, means for adjusting the teeth, and tapered keys received in the slots and engaging the periphery to retain the teeth firmly in adjusted position.

In testimony whereof, I affix my signature in presence of two witnesses.

MICHAEL GARLAND.

Witnesses:
L. G. SCHUESSLER,
X. H. PRICE.